UNITED STATES PATENT OFFICE.

WILLIAM B. BRITTINGHAM, OF NEW YORK, N. Y.

MANUFACTURE OF GLUCOSE FROM CACTUS.

SPECIFICATION forming part of Letters Patent No. 266,268, dated October 24, 1882.

Application filed April 11, 1882. (No specimens.)

*To all whom it may concern:*

Be it known that I, WILLIAM B. BRITTINGHAM, a citizen of the United States, and a resident of the city, county, and State of New York, have discovered that the plant known as the "cactus" is rich in glucose, which, when properly treated, is developed, and may be used in the manufacture of candies and confections, in combination with sugar and other saccharine substances.

In making available my discovery I take any of the plants known as "cactus," whether in a green or dried state, and macerate or subdivide them, and then place them in any suitable vessel or vessels and mix with them a suitable amount of water or highly-diluted acid, the amount of liquid used varying with the condition of the plant. The material thus prepared may be allowed to stand until fermentation has occurred, when there is to be added thereto diastase and starch, in about the proportion of one grain of diastase and two thousand grains of starch to, say, one hundred pounds of the material. The diastase and starch may, however, be added before fermentation has taken place, and the whole well mixed, when the liquid portion is drawn off and treated in any of the well-known methods for reducing it to the consistency desired. In order to secure all of the saccharine matter contained in the plant, I place the fibrous portions, after the liquid has been drained from them, in any suitable device and press them until all of the liquid has been extracted from them, the liquid thus obtained being placed with that drawn off and treated in the same manner for converting it into glucose.

Having thus described my discovery and the manner of rendering it available, what I claim, and desire to secure by Letters Patent, is—

The manufacture of glucose from the plant known as "cactus," substantially in the manner hereinbefore described.

In testimony whereof I affix my signature in presence of two witnesses.

WILLIAM B. BRITTINGHAM.

Witnesses:
    D. P. HOLLOWAY,
    A. RUPPERT.